United States Patent
Cafasso et al.

(10) Patent No.: US 12,301,655 B2
(45) Date of Patent: May 13, 2025

(54) PEER-TO-PEER (P2P) NETWORK IDENTIFICATION

(71) Applicant: Cujo LLC, Walnut, CA (US)

(72) Inventors: Matteo Cafasso, Helsinki (FI);
Leonardas Marozas, Vilnius (LT);
Filip Savin, Vilnius (LT)

(73) Assignee: Cujo LLC, Covina, CA (US)

( * ) Notice: Subject to any disclaimer, the term of this patent is extended or adjusted under 35 U.S.C. 154(b) by 37 days.

(21) Appl. No.: 17/983,954

(22) Filed: Nov. 9, 2022

(65) Prior Publication Data
US 2024/0155027 A1 May 9, 2024

(51) Int. Cl.
*H04L 67/104* (2022.01)
*H04L 67/1074* (2022.01)

(52) U.S. Cl.
CPC ...... *H04L 67/1051* (2013.01); *H04L 67/1059* (2013.01); *H04L 67/1078* (2013.01)

(58) Field of Classification Search
None
See application file for complete search history.

(56) References Cited

U.S. PATENT DOCUMENTS

| | | | |
|---|---|---|---|
| 7,730,216 B1 * | 6/2010 | Issa | H04L 67/104 709/214 |
| 8,627,473 B2 | 1/2014 | Coskun et al. | |
| 8,964,653 B2 | 2/2015 | Viswanath | |
| 9,009,299 B2 | 4/2015 | Memon et al. | |
| 9,900,866 B2 | 2/2018 | Viswanath | |
| 10,116,739 B2 | 10/2018 | Kuo et al. | |
| 10,911,532 B1 * | 2/2021 | Zhang | H04L 67/148 |
| 11,895,123 B2 * | 2/2024 | Bartolucci | H04L 63/123 |
| 2003/0217139 A1 * | 11/2003 | Burbeck | H04L 67/1097 709/224 |
| 2007/0076606 A1 * | 4/2007 | Olesinski | H04L 41/5022 370/230 |
| 2010/0145912 A1 | 6/2010 | Li et al. | |

(Continued)

FOREIGN PATENT DOCUMENTS

EP 1434144 A2 6/2004

OTHER PUBLICATIONS

Extended European Search Report for European Patent Application No. 22206535.1, mailed May 2, 2023, 10 pages.

(Continued)

*Primary Examiner* — Mohamed Ibrahim
(74) *Attorney, Agent, or Firm* — Dority & Manning, P.A.

(57) ABSTRACT

Information related to data communication between a plurality of connected devices is obtained. A plurality of initiated connections between the plurality of connected devices as directed edges between nodes in a directed graph based on the information are defined. Each initiated connection is represented by a directed edge from a source node to a destination node in the directed graph, and each node comprises an internet protocol (IP) address of the node. The directed graph is explored to determine a plurality of source/destination-pairs, wherein each source/destination-pair contains a source IP address of a source node of a directed edge, and a destination IP address of a destination node of the directed edge. A peer-to-peer (P2P) network including a plurality of P2P devices is detected based on the source/destination-pairs.

20 Claims, 8 Drawing Sheets

(56) References Cited

U.S. PATENT DOCUMENTS

| | | |
|---|---|---|
| 2017/0048308 A1* | 2/2017 | Qaisar .................. H04L 41/0895 |
| 2019/0282098 A1* | 9/2019 | Proud ....................... A61B 5/11 |
| 2020/0021647 A1 | 1/2020 | Shieh et al. |

OTHER PUBLICATIONS

Article 94(3) EPC Communication for European Patent Application No. 22184346.9, mailed Jun. 26, 2024, 6 pages.

* cited by examiner

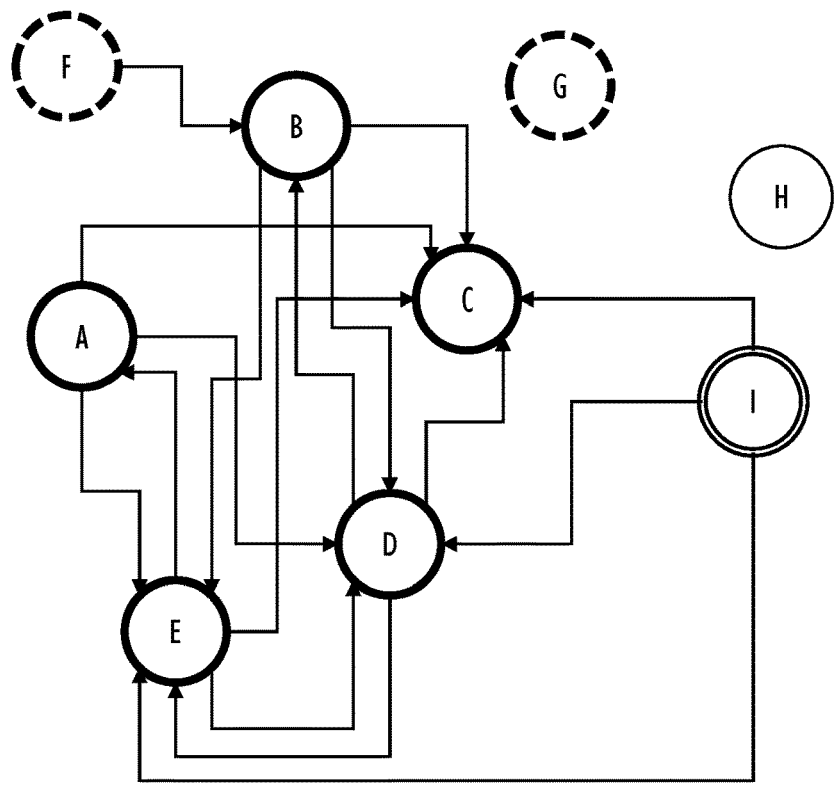
FIG. 3A
| NODE A:<br>AC<br>AD<br>AE | NODE B:<br>BC<br>BD<br>BE | NODE C: | NODE D:<br>DB<br>DC<br>DE | NODE E:<br>EA<br>EC<br>ED |
|---|---|---|---|---|
| NODE F:<br>FB | NODE G: | NODE H: | NODE I:<br>IC<br>ID<br>IE | |
FIG. 3B
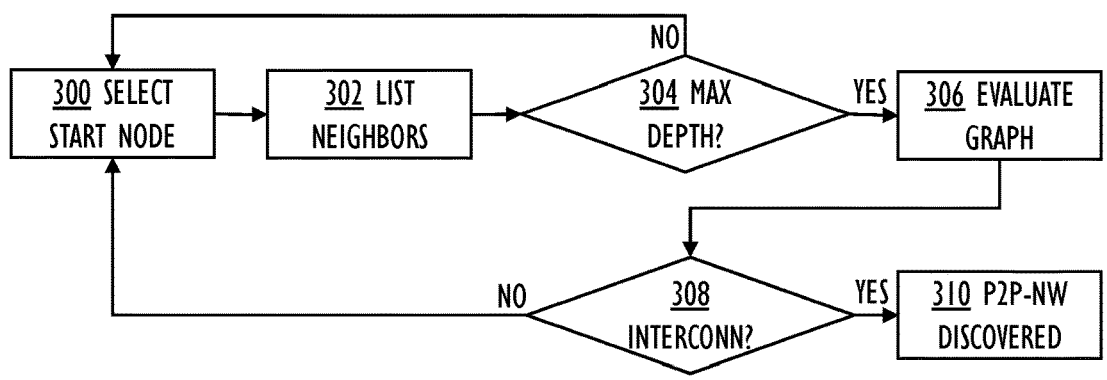
FIG. 3C

PEER-TO-PEER (P2P) NETWORK IDENTIFICATION

BACKGROUND

Connected devices, including user devices and Internet of Things (IoT) devices, are increasingly using peer-to-peer (P2P) networks. The P2P network is implemented as a virtual overlay network, wherein a subset of the connected nodes of an underlying physical network forms the P2P network. Identification of the P2P network is difficult for an operator of the physical network due to the virtual overlay nature of the P2P network. Connected devices are also confronted with cybercrime. Cybersecurity protects connected devices from theft, damage and disruption, for example. The identification of the P2P network and its P2P devices is useful in various operations related to the cybersecurity, such as in device identification and botnet blocking. Most of the current methodologies to identify P2P networks are based on either an inspection of the payload/headers, or an inspection of high traffic volumes. The first methodology is prevented by traffic encryption, whereas the second methodology is effective for network intensive applications such as content sharing, but not so effective with low traffic networks such as C&C (command-and-control)-based botnets or instant message applications.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which

FIG. 3A, FIG. 3B, FIG. 3C, FIG. 3D, FIG. 3E, and FIG. 3F illustrate various examples of a directed graph and its exploration;

DETAILED DESCRIPTION

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

The P2P network may comprise numerous P2P devices, such as connected devices. A subset of all connected devices in an underlying physical network topology typically act as P2P devices of the virtual overlay P2P network.

The P2P devices may be equal in the sense that each P2P devices acts both as a client and as a server to other P2P devices of the P2P network. This is in contrast to a typical client/server architecture, where a (centralized) server serves a plurality of (distributed) clients.

Two P2P devices exchange data with each other using the underlying physical network so that on an application layer the two P2P devices communicate via a direct logical overlay link (defining a path through the underlying physical network). The overlay links are used for indexing and peer discovery. The way the P2P devices are linked to each other using the overlay links, and the way the resources offered by the P2P network are indexed and located, classifies the P2P network as an unstructured P2P network (no particular structure of the overlay network), a structured P2P network (a specific topology of the overlay network, using a distributed hash table, which assigns an ownership of a specific file to a specific P2P device, for example), or a hybrid P2P network (a combination of P2P and client/server architectures, with a central server helping P2P nodes to find each other, for example).

The P2P networks may be used for various application areas: content sharing (such as BitTorrent, and InterPlanetary File System IPFS), software update delivery (such as Windows® Update Delivery Optimization WUDO, and apt-p2p (Debian and derivates)), blockchain implementation (such as Bitcoin®, and Ethereum®), network traffic anonymization (such as The Invisible Internet Project I2P), and distributed C&C network for botnets (such as Conficker, and Mirai).

Figure 1A:
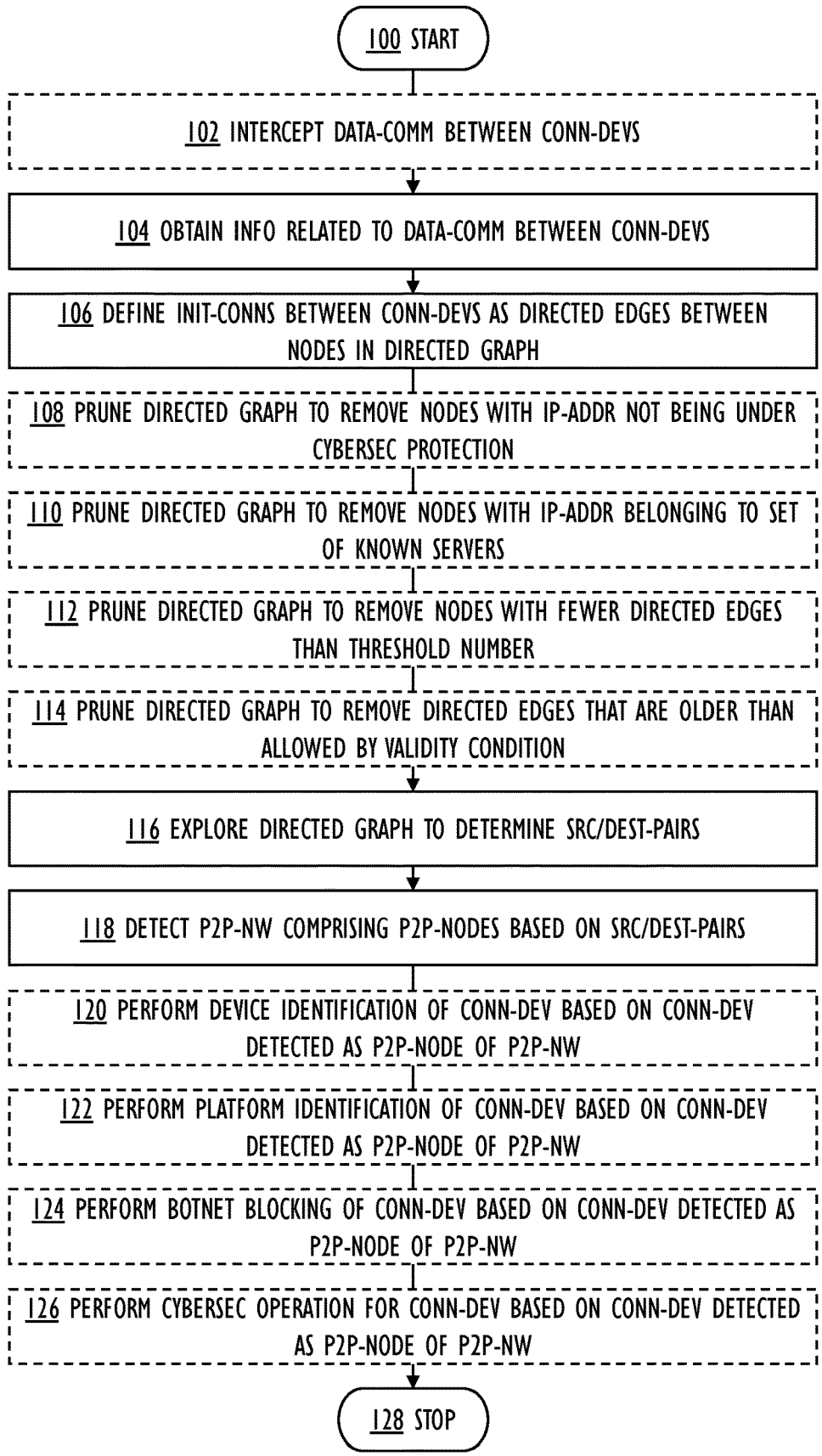
FIG. 1A, FIG. 1B, and FIG. 1C are flowcharts illustrating examples of a method.
Figure 1B:
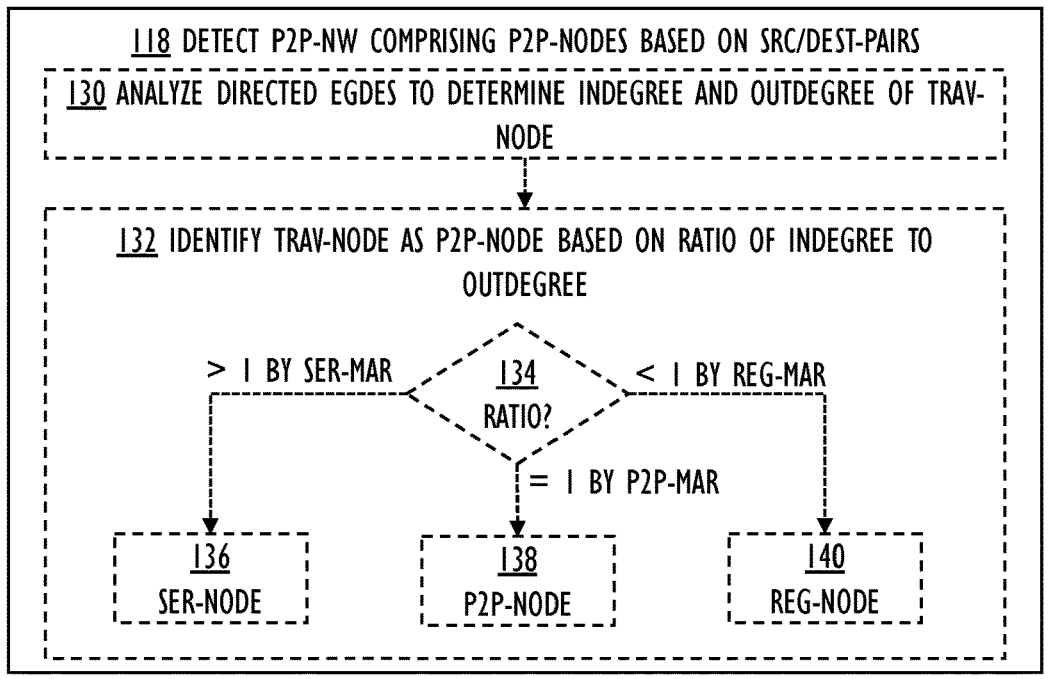
Figure 1C:
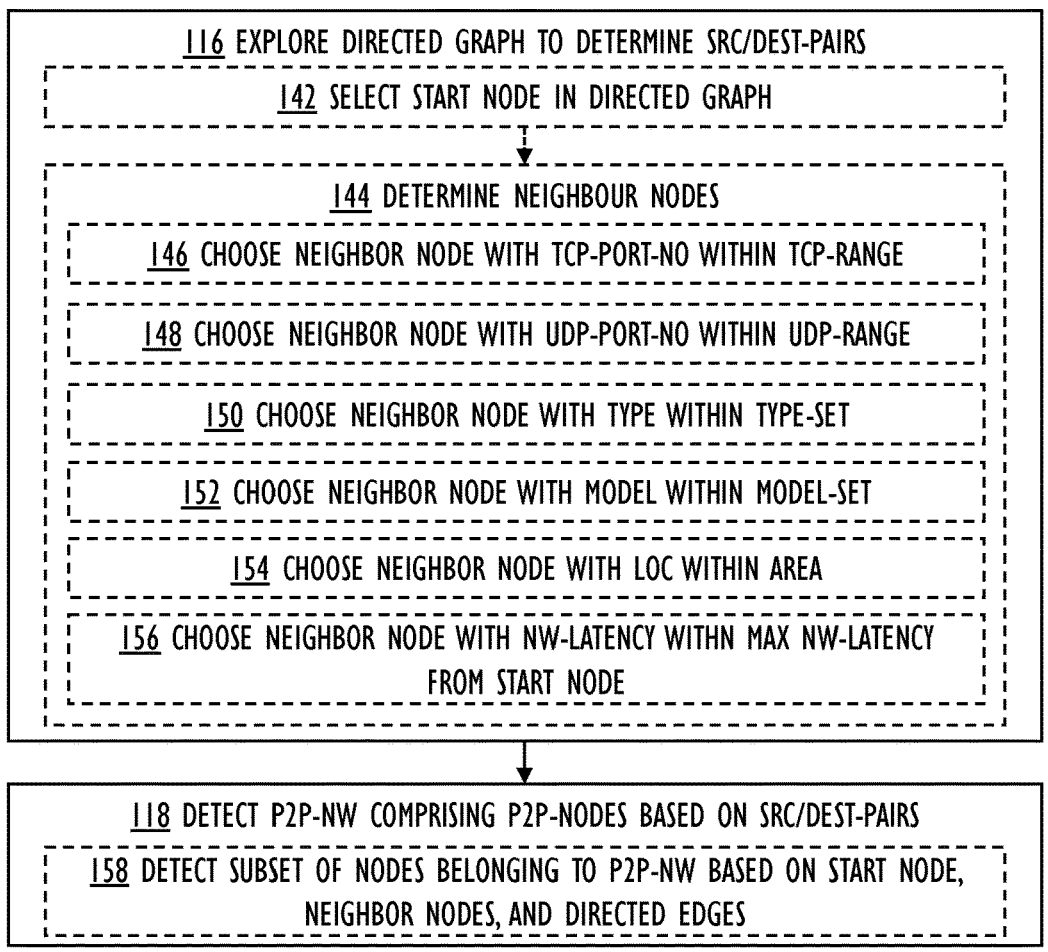

FIG. 1A, FIG. 1B, and FIG. 1C illustrate a method. The method performs the P2P network identification.

The method starts in 100 and ends in 128. The method may run in principle endlessly, or on demand. The infinite running may be achieved by looping back from the final operation 118 (or from a later optional final operation 120/122/124/126) to the first operation 104 (or to an optional first operation 102). The on demand running may be achieved by performing the operations in response to a user request or a system operator request, or in response to a periodic trigger (such as a repeated expiry of a preset timer).

The operations are not strictly in chronological order in FIG. 1A, FIG. 1B, and FIG. 1C, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

Figure 2:
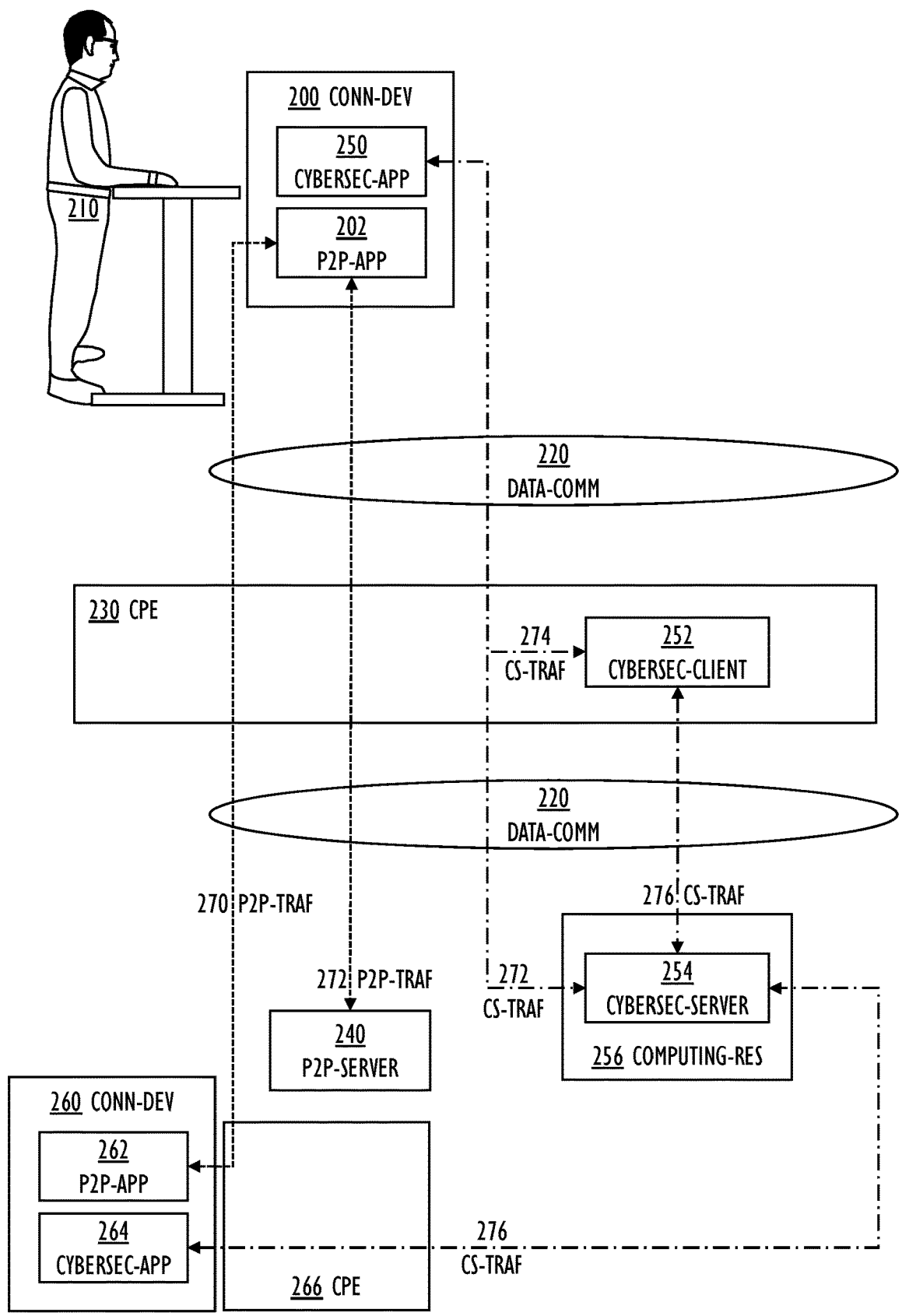
FIG. 2 is a block diagram illustrating an example implementation environment for the method.

FIG. 2 illustrates an example implementation environment for the method. The method may be a computer-implemented method.

The method may be divided into two parts. In the first part, the P2P network is identified, and in the second part the identified P2P network and its P2P devices is used (even repeatedly) for various operations related to the cybersecurity.

First, information related to data communication 270 between a plurality of connected devices 200, 260 is obtained 104.

As used herein, the term "connected device" 200 refers to a physical device with communication capabilities configured to communicate via the internet. The connected device 200 includes, but is not limited to, a user device, an IoT device, or another ubiquitous computing device.

The user device may be a terminal, a mobile device, a user equipment (UE), a radio terminal, a subscriber terminal, a smartphone, a mobile station, a mobile phone, a desktop computer, a portable computer, a laptop computer, a tablet computer, a smartwatch, smartglasses, a game terminal, or some other type of a wired or wireless mobile or stationary user communication device operating with or without a subscriber identification module (SIM) or an eSIM (embedded SIM).

The IoT device is provided with processing and communication technology and may also include one or more sensors and a user interface, and may be a stand-alone device, or an embedded device in a lighting fixture, thermostat, home security system, camera, smart lock, smart doorbell, smart refrigerator, or another household appliance, heating and cooling system, home and building automation system, vehicle, health and fitness monitor, remote health monitoring system, environmental sensor, IP camera, or a network attached storage (NAS), etc.

As used herein, the term "data communication" 220 refers to the transmission and reception of (digital) data by the connected device 200. The data communication 220 is transferred over one or more communication channels (implemented by copper wires, optical fibers, and wireless communication using radio spectrum, for example) between the connected device 200 and other network nodes such as another connected device 260. A communication protocol may be used to transport payload data in packets. In a connection-oriented data communication 220, a connection needs to be established for transferring the payload data. In a connectionless data communication 220, the payload data is transferred over different paths with an independent routing.

The connected device 200 may create a connection 270 using a packet protocol for its P2P application 202 to a P2P application 262 of the other connected device 260.

The packet protocols include, but are not limited to, TCP/IP (Transmission Control Protocol/Internet Protocol), UDP (User Datagram Protocol), and QUIC™, which establishes a multiplexed transport on top of the UDP.

Various HTTP/HTTPS (Hypertext Transfer Protocol/Hypertext Transfer Protocol Secure) requests may then be transferred in the connection 270, (using TCP streams or UDP datagrams, for example).

In the Internet protocol suite, the connection 270 is operated in a link layer, an internet layer, and a transport layer, and the requests transmitted in the connection 270 are operated in an application layer.

In this way, the connected devices 200, 260 exchange data using the underlying TCP/IP network, but the P2P applications 202, 262 communicate via the logical overlay link on the application layer.

The information related to the data communication 220 may be obtained 104 so that prior to obtaining 104 the information, the data communication 220 between the plurality of connected devices 200, 260 is intercepted 102. The data communication 220 may be intercepted 102 by a plurality of customer premises-equipment (CPE) 230, 266 implementing local networks, for example.

The information related to the data communication 220 may be obtained from the intercepted data communication 220, possibly using suitable techniques for data acquisition including filtering and analysis, for example.

The method may operate in real-time or near real-time so that numerous CPEs 230, 266 perform the interception 102, and possibly also the obtaining 104 of the information. Another alternative is that the interception is performed by the CPEs 230, 266, but the information is obtained 104 in one or more cybersecurity servers 254 running on a computing resource 256. The method may also operate in a kind of a batch mode, i.e., the method is operated in response to a system request or a user request, or periodically, and the obtained information may be from a certain time period, such as from 24 hours, one week, one month, three months, one year, or another time period, of which the information may be stored considering the storage space and cost requirements, for example. The time period may also be a sliding window, i.e., the information is stored from the present point in time backwards for a predetermined range (such as one week from the present date) with a first-in, first-out principle.

The CPEs 230, 266 and/or the cybersecurity server 254 may store raw data from the data communication 220 into a database. The database may be a data lake including the raw data, but also another type of data repository may be used. In addition to the raw data, or as an alternative, stored data regarding the data communication 220 may include refined data such as datasets, markers, connection requests, etc. A suitable network flow monitoring technology, such as Cisco® NetFlow or alternative network flow monitoring technologies may be used to intercept the data communication 220. NetFlow, or its equivalents collect IP network traffic as it enters or exits an interface (in the CPE 230, 266, for example), and based on the collected traffic, a source and a destination of the network traffic within the data communication 220 may be determined as the information.

Based on the data collected, stored and analyzed in the data lake or other repository, several possible device type or model markers may be discovered based on pre-existing device intelligence data. As the P2P network may be platform specific (device types do not overlap, device models may or may not overlap), data clustering approach-based on the device type or device model may be prioritized to reduce a number of P2P network candidates and narrow down to more meaningful results.

As used herein, the term "intercepting" 102 refers to user-approved lawful interception or monitoring of the data communication 220, with a purpose and goal of increasing cybersecurity related to the connected device 200 and its operating environment. The intercepting may be implemented so that the data communication 220 is passively monitored, i.e., the data communication 220 is not affected by the intercepting. Alternatively, if needed, the intercepting may include a seizing a part of the data communication 220, i.e., the data communication 220 is actively influenced so that connection and/or requests are blocked until it may be decided whether a cybersecurity action is required.

Figure 4:
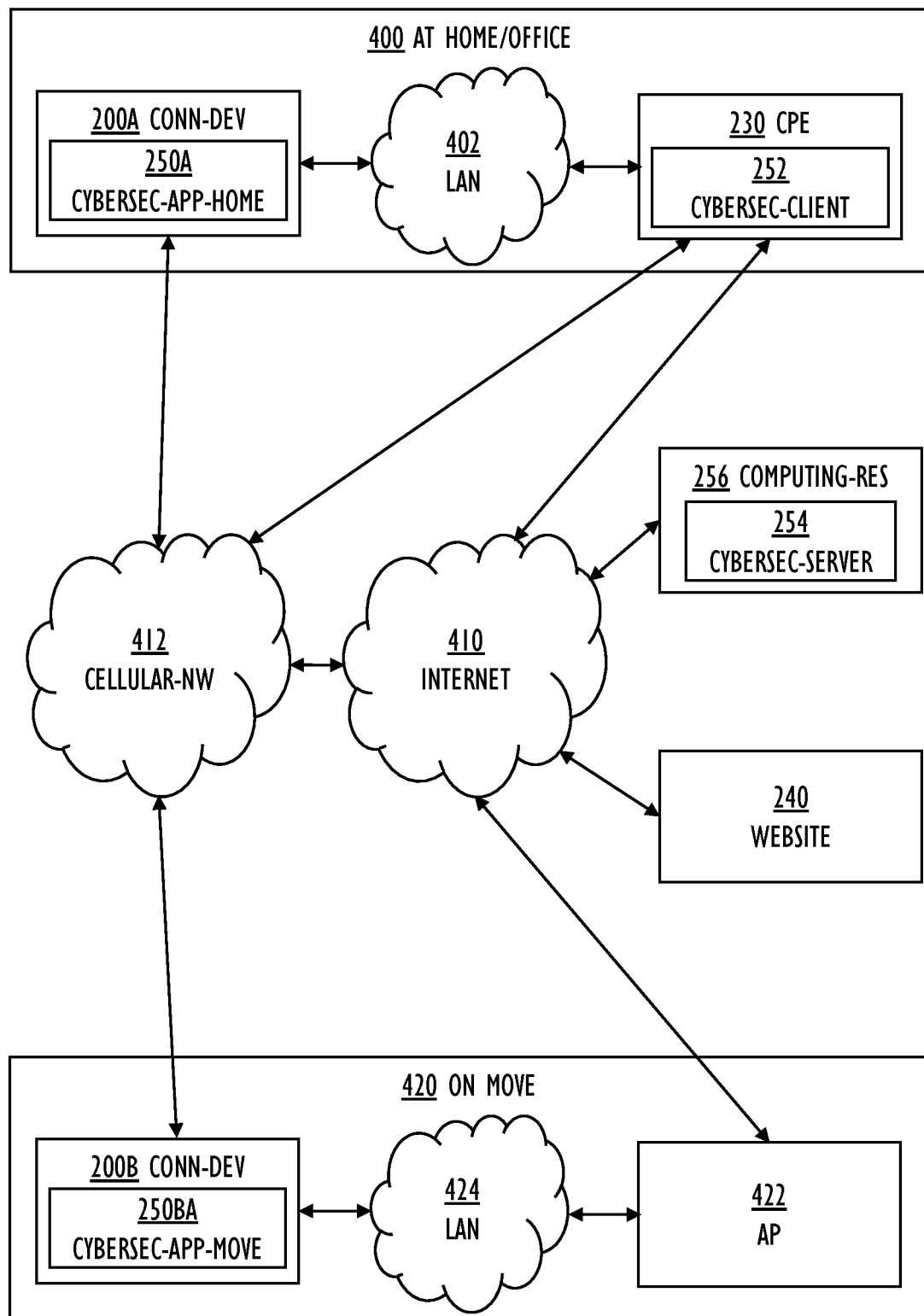
FIG. 4 is a block diagram illustrating an example operation environment.

Intercepting 102 the data communication 220 may be implemented so that data communication 220 of the connected device 200, 260 over a communication network is intercepted 102. The intercepted 102 communication network may comprise a local area network 402 implemented by the CPE 230 as shown in FIG. 4. The intercepting 102 may be focused on detecting a connection establishment between the connected devices 200, 260. Additionally, or alternatively, the intercepting 102 may be focused on detecting one or more of a hypertext transfer protocol request message, a hypertext transfer protocol response message, a hypertext transfer protocol secure request message, and a hypertext transfer protocol secure response message transmitted between the connected devices 200, 260.

Next, a plurality of initiated connections between the plurality of connected devices 200, 260 are defined 106 as directed edges between nodes in a directed graph based on the information.

As used herein, the term "directed graph" refers to a graph theory in mathematics. With the directed graph, a model of a communication network may be described.

FIG. 3A describes an example directed graph. A connected device 200, 260 is described as a node (or vertex, or point), labelled with a letter "A", "B", "C", "D", "E", "F", "G", "H", "I", "J", "K", and "L". Note that the labelling with the letters is just a simple example, and various more complicated naming conventions may be used, such as labelling each node with an IP address of the corresponding connected device 200, 260.

Directed edges (or lines, or links, or arcs) are shown as arrows from one node to another node. The directed edges need not be described as straight lines, because the definition of the graph is not a geometric definition.

The directed graph is explored 116 to determine a plurality of source/destination-pairs. Each source/destination-pair contains a source IP address of a source node of a directed edge, and a destination IP address of a destination node of the directed edge.

If the P2P network is already known, its node list is maintained. To do so, an iteration over all nodes, which appear to communicate with a minimum subset of nodes belonging to the known P2P node list, is needed (these nodes are marked with a bold circle in FIG. 3A). Nodes not belonging anymore to the list (these nodes are marked with a dotted circle) will not show any recent connections in the graph and they may be removed. New nodes (these nodes are marked with a double circle) are connected devices, which recently showed a noticeable amount of interaction with the P2P node list. In other words, the method may be executed to identify a new P2P network and its constituent P2P nodes, but also to update the node composition of the previously identified known P2P network.

FIG. 3B describes the directed edges as pairs for each node. "AB", for example, denotes a directed edge from the node A to the node B. Consequently, node A, for example, then has directed edges AC, AD, and AE.

In this way, the directed graph models pairwise relations within the directed graph, wherein each directed edge links two nodes asymmetrically.

Each initiated connection is represented by a directed edge from the source node to the destination node in the directed graph. Each node comprises an IP address of the node.

Note that the directed graph of FIG. 3A is just an illustration, and the method may describe the graph with various data structures, such as a first data structure containing the nodes represented by their IP addresses, and a second data structure contains the directed edges as pairs containing the IP address of the source node and the IP address of the destination node.

In the example of FIG. 3A and FIG. 3B, the label with the letter may represent a specific IP address. For example, label "A" may represent one specific IP address, and label "B" another specific IP address, and consequently the directed edge "AB" denotes the directed edge from the source IP address "A" to the destination IP address "B".

Finally, a P2P network comprising a plurality of P2P devices is detected 118 based on the source/destination-pairs.

In the example of FIG. 3A, the detected 118 P2P network comprises the P2P nodes A, B, C, D, E, and I, i.e., the connected devices with the IP addresses A, B, C, D, E, and I are P2P devices.

As shown in FIG. 3B, nodes A, B, D, E and I contain same destination nodes to a large degree, and are interconnected between each other, and thereby belong to a same P2P network with a high probability. Note that node C may be a special case, a central server of a hybrid P2P network, as it seems to only act as a destination node, and therefore does not have any edges in its table in FIG. 3B. Such P2P-server 240 and its network traffic 272 is shown in FIG. 2.

Once a sizeable enough (a predetermined minimum number of nodes, for example) cluster of nodes is identified, the cluster may be considered as a P2P network, and the discovery of the remaining nodes may be accelerated. The P2P network may further be analyzed to find commonalities between the nodes. These commonalities may be the use of a limited set of TCP/UDP ports, a specific category of devices, etc. These commonalities may further strengthen the P2P network assumption and may be used to further speed up discovery of additional or new nodes of the P2P network.

In general, the P2P network comprising the plurality of P2P devices is detected 118 by analyzing the source-destination-pairs in order to find out typical communication models within the network of nodes/vertices.

Figure 3D:
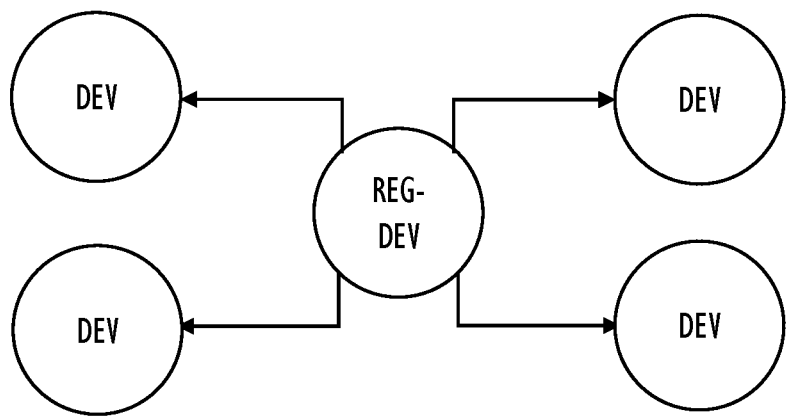

FIG. 3D illustrates a typical communication model of a regular device with a one-to-many relationship, i.e., directed edges (=initiated connections) start from the regular device acting as a source node but not as a destination node. The regular device rather acts like a client, initiating connections upon demand of its running applications.

Figure 3E:
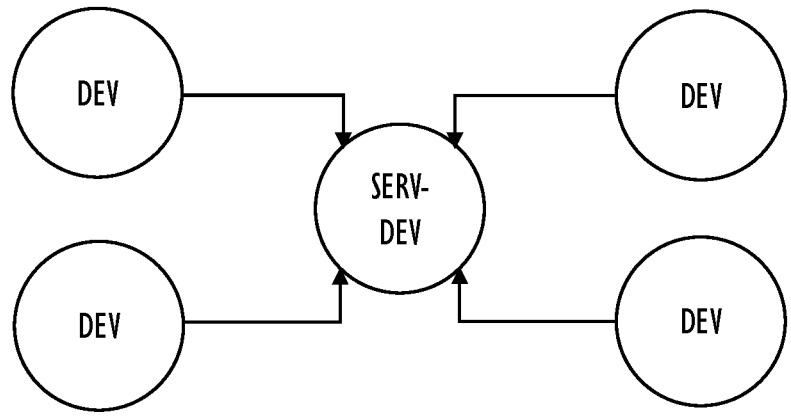

FIG. 3E illustrates a typical communication model of a server device with a many-to-one relationship, i.e., directed edges end to the server device acting as a destination node but not as a source node. The server device acts like a server towards clients, waiting for client initiated connections. Some distributed applications use a push communication model wherein the server pushes out information to the clients, but also in this case a unidirectional relationship (i.e., one-to-many relationship) is observed.

Figure 3F:
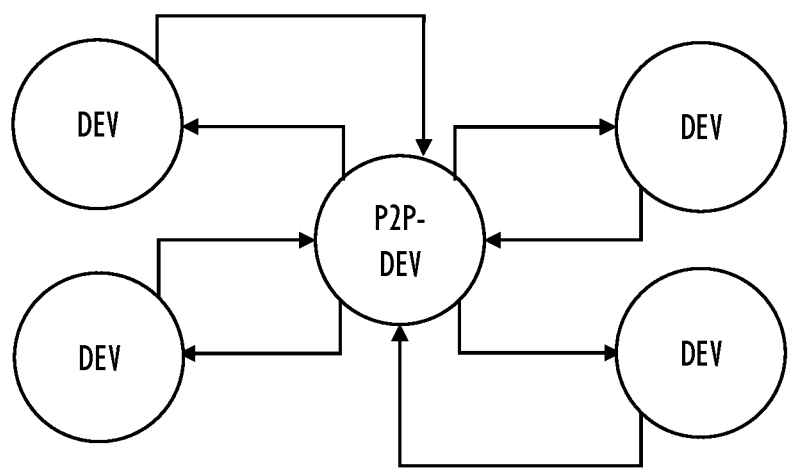

FIG. 3F illustrates a typical communication model of a P2P device with a many-to-many relationship, i.e., directed edges (=initiated connections) start from the P2P device acting as a source node in a client role, and directed edges also end to the P2P device acting as a destination node in a server node. This is the reason for the term "peer" node (the node has the same abilities as the other nodes in the group) in contrast with the client/server nomenclature.

The P2P network comprising the plurality of P2P devices may be detected 118 by analyzing the source/destination-pairs and finding out a match with the many-to-many relationship.

An "indegree" of a node defines a number of head ends adjacent to a node, i.e., a number of initiated connection having the node as the destination node. An "outdegree" of a node defines a number of tail ends adjacent to a node, i.e., a number of initiated connections having the node as the source node. For the example of FIG. 3A, Table 1 shows the indegree and outdegree of each node.

TABLE 1

Indegree and outdegree

| Node | Indegree | Outdegree |
|------|----------|-----------|
| A | 1 | 3 |
| B | 2 | 3 |
| C | 5 | 0 |
| D | 4 | 3 |
| E | 4 | 3 |
| F | 0 | 1 |
| G | 0 | 0 |
| H | 0 | 0 |
| I | 0 | 3 |

Directed edges of each traversed node in the directed graph may be analyzed 130 to determine an indegree of each traversed node, and an outdegree of each traversed node. A traversed node may be identified 132 as a P2P device based on a ratio of the indegree of the traversed node to the outdegree of the traversed node.

The traversed node may be identified 138 as a P2P device in response to detecting 134 that the ratio is one by a predetermined margin. As shown in FIG. 1B, the ratio may be checked with a test in block 134. The other outcomes of the test 134 may be: the traversed node may be identified 136 as a server device in response to detecting 134 that the ratio is greater than one by a predetermined server margin, or the traversed node may be identified 140 as a regular device in response to detecting 134 that the ratio is smaller than one by a predetermined regular margin.

Note that the above Table 1 is not illustrating the identifications and their margins as the indegrees and outdegrees are quite small numbers not reflecting a real life scenario observed over a longer time period with greater indegree and outdegree numbers.

Prior to exploring 116 the directed graph to determine the plurality of source/destination-pairs, the directed graph may be pruned in various way to bring it down to a manageable size. Note that the examples illustrate very simple examples, whereas in real use cases the number of connected devices 200, 260 may be quite large, ranging from hundreds of thousands to millions and even up to thousands of millions. "Pruning" refers to trimming or cutting away the excess, by removing the redundant or not interesting nodes of the directed graph, for example. The optional pruning mechanisms reduce the complexity of the problem, and thereby reduce the needed computing resources. Depending on the amount of computing resources available, the degree of pruning may be adjusted.

The directed graph may be pruned 108 to remove nodes with an IP address not being under a cybersecurity protection provided by an operator. The operator providing the cybersecurity protection may be a network service provider providing the CPE 230, for example, or a cybersecurity service provider, for example. This is logical as only the connected device 200, 260 under the cybersecurity protection of the operator may benefit from the described processing. However, if desired, nodes not being under the cybersecurity protection may still be detected as belonging to the P2P network based on an analysis of the directed edges between the nodes under the cybersecurity protection and the nodes not being under the cybersecurity protection. For example, a node X (not shown on FIG. 3A) may be detected as being a part of the P2P network based on its communication (and possibly also based on its indegree/outdegree ratio) with nodes A, B, and C belonging to the P2P network. If the node X is a part of a botnet, for example, all communication with the node X by the nodes under the cybersecurity protection may be blocked. With the deployment of IPv6 (Internet Protocol version 6), the possible need for a network address translation (NAT) between a first IP address space of a network service provider providing the cybersecurity protection and a second IP address space of a network service provider not providing the cybersecurity protection is removed in such a use case.

The directed graph may be pruned 110 to remove nodes with an IP address belonging to a set of known servers. The set of known servers may include IP addressing belonging to known service providers, including, but not being limited to, public cloud computing platforms (such as Amazon® Web Services® AWS®, Google® Cloud Platform® GCP®, and Microsoft® Azure®), and well-known organizations (such as public organizations and commercial companies).

The directed graph may be pruned 112 to remove nodes having fewer directed edges than a predetermined threshold number. This will rule out all IoT devices, which rarely communicate but maybe only with a very small number or servers, for example.

Each directed edge in the directed graph may comprise a timestamp of the data communication. The directed graph may be pruned 114 to remove directed edges that are older than allowed by a predetermined validity condition. The predetermined validity condition may be defined as a date and time range, or for a sliding window as a maximum age (the timestamp may not be older than one month in view of the present date, for example).

The directed graph may be explored 116 to determine the plurality of source/destination-pairs in various ways. This is a resource intensive operation. Therefore, one or more optimization methodologies may be considered. A good optimization methodology is to increase the chance of defining the directed edge between two nodes, which are likely to belong to the P2P network. This may be achieved by applying a specific criterion or criteria when choosing the next node to be explored.

A start node in the directed graph may be selected 142. A plurality of neighbor nodes for the start node may then be determined 144. Each neighbor node is connected to the start node by a directed edge, or is connected to the start node by a predetermined number of directed edges between the plurality of neighbor nodes. The P2P network comprising the plurality of P2P devices is detected 118 based on the source/destination-pairs so that a subset of the nodes is determined 158 as belonging to the P2P network based on the start node, the plurality of neighbor nodes, and the directed edges between the start node and the plurality of neighbor nodes.

FIG. 3C illustrates an example implementation of this graph exploration. A node (in the first time this the start node) is selected 300, and its neighbors are listed 302. If the maximum depth is reached, the explored directed graph is evaluated 306, or else a next node in the directed graph is selected. The maximum depth may be tested in a block 304. If a subset of interconnected nodes is detected as a result of evaluating 306 the directed graph, the P2P network is discovered 310 and the interconnected nodes are defined as P2P devices, or else another node (=another start node) is selected 300. The detection of the interconnected nodes may be tested in a block 308.

The neighbor nodes may be determined in various ways, of which at least three options may be identified, and each of these options may be used singularly, or in any combination including two options, or including all three options.

Each node in the directed graph may comprise one or more of a transmission control protocol (TCP) port number of the connected device 200, 260 and user datagram protocol (UDP) port number of the connected device 200, 260. The plurality of neighbor nodes for the start node may then be determined 144 so that a neighbor node with a TCP port number being within a predetermined range of TCP port numbers is chosen 146, and/or a neighbor node with a UDP port number being within a predetermined range of UDP port numbers is chosen 148.

Each node in the directed graph may comprise one or more of a type of the connected device 200, 260, and a model of the connected device 200, 260. The plurality of neighbor nodes for the start node may then be determined 144 so that a neighbor node with a type of the connected device 200, 260 being within a predetermined set of connected device types is chosen 150, and/or a neighbor node with a model of the connected device 200, 260 being within a predetermined set of connected device models is chosen 152. This is because the P2P networks tend to be platform specific, i.e., the connected device 200, 260 may need to be of a specific type, or the connected device 200, 260 may need to be of a specific model. The type and/or model of the connected device 200, 260 directly defines the technical characteristics and possible limitations of the connected device 200, 260. For example, if the connected device 200, 260 is a smartphone, tablet computer or laptop provided with the iOS mobile operating system, the neighbor nodes being provided with a competing mobile operating systems such as Android are not capable of being a part of a P2P network that is only running on iOS devices.

The type of the connected device 200, 260 may define that the connected device 200, 260 is a smartwatch, smartphone, tablet computer, laptop, or an IoT device, which may indicate that the connected device 200, 260 may belong to a certain kind of a P2P network or not. For example, if the type of the connected device 200, 260 is a smartwatch, it may be unlikely that the connected device 200, 260 belongs to a streaming video service P2P network. Or the IoT device 200, 260 may not include a touch screen but only one or more LEDs (light-emitting diode), whereby the IoT device 200, 260 may be excluded from being a neighbor in the streaming video service P2P network. Or, in general, certain types of IoT devices 200, 260 have quite limited memory and processing capabilities and may therefore be excluded based on their type as potentially being a candidate for a P2P network requiring at least memory and processing capabilities of a smartphone.

Each node in the directed graph may comprise one or more of a geographical location of the connected device, and a network latency of the connected device 200, 260. The plurality of neighbor nodes for the start node may then be determined 144 so that a neighbor node with a geographical location within a predetermined geographical area is chosen 154, and/or a neighbor node with a network latency within a maximum network latency from the start node is chosen 156. To optimize performance and reduce inter-node latency, several P2P networks group their peers based on their distance, and consequently neighbor nodes that are too far away geographically or with a too large network latency may be removed from neighbor candidates. The distance may be inferred geographically or simply based on the observed network latency. This aspect may also be considered when selecting a suitable set of connected devices for an analysis from the data lake or other repository.

Subsequent to detecting 118 the P2P network comprising the plurality of P2P devices based on the source/destination-pairs, the information of the detected P2P network, and the information of the specific device being detected as a P2P device may be used for various cybersecurity operations.

A device identification of the connected device may be performed 120 based on the connected device 200, 260 being detected as a P2P device belonging to the P2P network, or the device identification precision may be improved. A growing number of IoT devices also rely on the P2P network to distribute content and share information between each other. The belonging of the connected device to the P2P network may act as a fingerprinting marker for the connected device. This becomes particularly effective when IoT devices do not share other common characteristics such as a hardware version or an operating system version. A recent example of such IoT devices are the Helium® devices, of which information at the time of writing of this patent application is available at www.helium.com. Other relevant example are storage solutions, such as Space Monkey™ (acquired by Vivint®) and Cubbit™, of which information at the time of writing of this patent application is available at www.cubbit.io.

A platform identification of the connected device may be performed 122 based on the connected device 200, 260 being detected as a P2P device belonging to the P2P network. Traditional mechanisms employed to identify and block applications based on the adopted TCP/UDP ports are easily circumvented with the port randomization, often employed with less desirable applications such as BitTorrent. Nevertheless, the P2P platform may still be identified based on the fact that the connected device tries to join the overlay network itself. This becomes easily evident as the connected device will try to contact several devices known to belong to the P2P network.

Once able to properly identify an existing P2P network, such information may be used as a marker for identifying a platform (such as BitTorrent) and also block P2P-based behavior. The use of overlay P2P networks for distributing data is a well-known bandwidth optimization strategy. Taking a streaming service as a hypothetical example, the provider may significantly reduce the data transferred to its clients by employing the clients themselves as content distributors. By letting the clients distribute popular content between themselves, the provider experiences a significant reduction of transferred data, while also improving the customer experience.

The knowledge that the connected device is joining a P2P network may be employed as an indicator that such connected device is using a specific platform/service. Moreover, the knowledge regarding the P2P network itself may improve the capability of preventing an undesired platform from being executed on the connected device. This may be useful in parental control, wherein unwanted such as adult-oriented content is blocked from a connected device of an underaged user.

A botnet blocking for the connected device 200, 260 may be performed 124 based on the connected device being detected 200, 260 as a P2P device belonging to the P2P network. The botnet blocking for the connected device 200, 260 may include blocking the data communication 220 of the connected device 220, 260 until the connected device 200, 260 is cleaned, i.e., the botnet software is removed from the connected device 200, 260 by an appropriate cybersecurity operation. A connected device trying to communicate with one or more devices known to belong to a malicious P2P botnet is a strong indicator of compromise (IoC), which in computer forensics indicates a computer intrusion. It is in fact very unlikely that a connected device (especially an IoT device) will try to reach a group of private devices during its normal operation. If that list of devices is known to belong to a botnet, all known device IPs of that botnet may be blocked automatically preventing further damage. The botnets make use of the P2P overlay networks for commands and content distribution. Because it is much harder to disrupt the operation of the P2P network as compared to disrupting a set of isolated servers. The isolated servers may easily be seized by law enforcement officials.

Alternatively, or in addition to these three options, another cybersecurity operation may be performed 126. The other cybersecurity operation may be such that it increases or restores safety of the connected device 200, 260, safety of the CPE 230, and/or the safety of the network in general.

FIG. 2 also illustrates communication between various actors of the method.

The connected device 200 may create a connection 274 using a packet protocol between a cybersecurity application 250 on the connected device 200 and a cybersecurity client 252 on the CPE 230. But this is not necessarily needed, as the connected device 200 may not be provided with the cybersecurity application 250. Note a possible connection 272 between the cybersecurity application 250 and the cybersecurity server application 254, and another possible connection 276 between a cybersecurity application 264 of the other connected device 260 and the cybersecurity server application 254.

FIG. 4 illustrates an example operation environment. Two basic use cases are described: at home or office 400, and on the move 420.

The Internet 410 uses the Internet protocol suite including TCP/IP and UDP to globally connect computer networks so that communication is enabled between connected devices 200A, 200B and various services provided typically by websites. The Internet 410 comprises public networks, private networks, academic networks, business networks, government networks, etc. interlinked with various networking technologies. The various services provide access to vast WWW (World Wide Web) resources, wherein webpages may be written with HTML (Hypertext Markup Language) or XML (Extensible Markup Language) and accessed by a browser or another application (such as a mobile app) running in the connected device 200A, 200B.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc. Note that different service providers, such as network operators, cloud service operators, and cybersecurity operators, just to name a few, may operate and/or manage the various network nodes shown in FIG. 2.

Device identification, which may be defined as a capability to detect various apparatuses, such as the connected device 200A in the home/office LAN 402, also increases the cybersecurity. Traditionally, a MAC (Medium/Media Access Control protocol) address assigned by a device manufacturer and used by wireless radio signals within the LAN has been used for the device identification. However, MAC spoofing, which anonymizes and randomizes the MAC address to increase privacy, hinders the device identification based on the MAC address. Machine learning algorithms may use a number of other data items (such as device-specific unique radio interface characteristics, other current and historic unique identifiers related to the connected device 200A and its communication) to enable the device identification despite of the MAC spoofing.

Numerous cellular networks (or mobile networks) 412 provide access to the Internet 410 for the connected devices 200A, 200B (both at home or office 400 and on the move 420) by providing a wireless link in a radio cell implemented by a base station (or a base transceiver station, an eNodeB (eNB), a gNodeB (gNB), or an access point, for example) implemented using a standard technology, including, but not being limited to a cellular radio network (GSM, GPRS, EGPRS, WCDMA, UMTS, 3GPP, IMT, LTE, LTE-A, 3G, 4G, 5G, 5G NR (5G New Radio), 6G, etc.), a wireless local area network (such as WLAN (Wireless Local Area Network), Wi-Fi, etc.), or a short-range radio network (such as Bluetooth or Bluetooth Low Energy (BLE), etc.). The use of the cellular radio network may necessitate use of a subscriber identity module (SIM), either as a physical chip, or as an embedded-SIM (eSIM), for example.

The CPE 230 is located at home or office 400 of the user 210 of the connected device 200A. The CPE 230 is stationary equipment connected to a telecommunication circuit of a carrier (such as a broadband service provider) at a demarcation point. The demarcation point may be defined as a point at which the public Internet 410 ends and connects with a LAN (Local Area Network) 402 at the home or office of the user of the connected device 200A. In this way, the CPE 230 acts as a network bridge.

The CPE 230 may include one or more functionalities of a router, a network switch, a residential gateway, a set-top box, a fixed mobile convergence product, a home networking adapter, an Internet access gateway, or another access product distributing the communication services locally in a residence or in an enterprise via a (typically wireless) LAN and thus enabling the user of the connected device 200A to access communication services of the broadband service provider. Note that the CPE 230 may also be implemented with wireless technology, such as a 5G CPE 230 configured to exchange a 5G cellular radio network signal with a base station operated by the broadband service provider, and generate a Wi-Fi (or WLAN) or wired signal to implement the LAN 402 to provide access for the connected device 200A. Furthermore, the 5G CPE 230 performs the conversion between the 5G cellular radio network signal and the Wi-Fi or wired signal.

On the move 420, the user of the connected device 200B may access the Internet 410 via the cellular networks 412, or via a local access point 422 implementing a local area network 424. The access point 422 may be provided with similar technology as used by the CPE 230. The access point 422 may be located at a bus station, at a train station, at an airport, at a hotel room, at a hotel lobby, at a conference or fair center, at a shopping mall, at a cafe, at a museum, at a rented apartment, or at another public or private location.

Figure 5A:
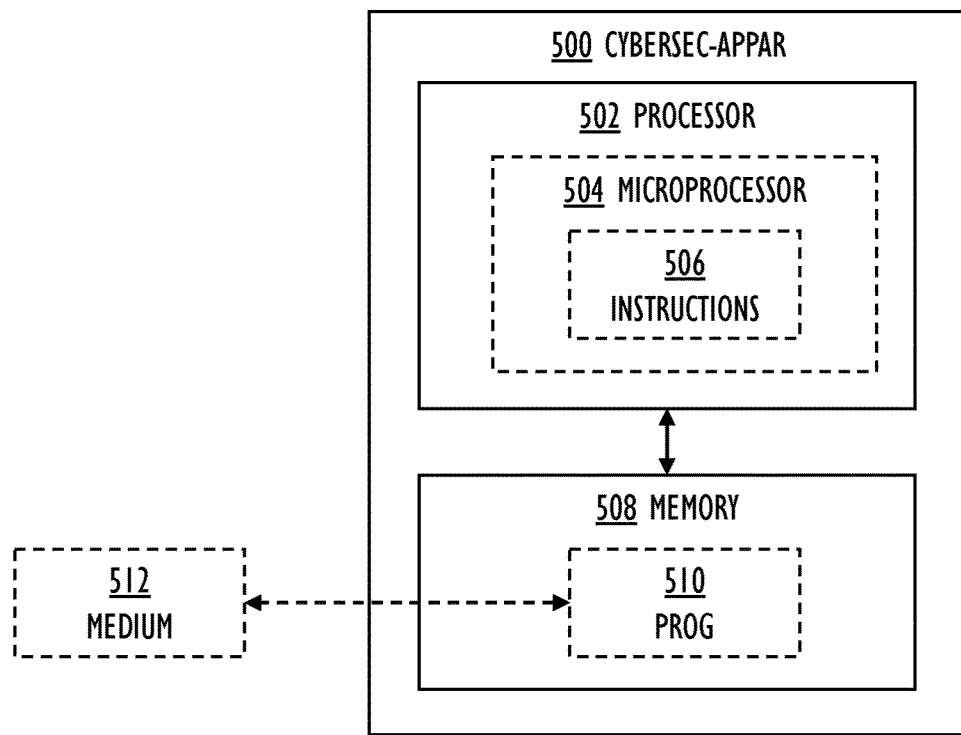
FIG. 5A and FIG. 5B are block diagrams illustrating examples of a cybersecurity apparatus.
Figure 5B:
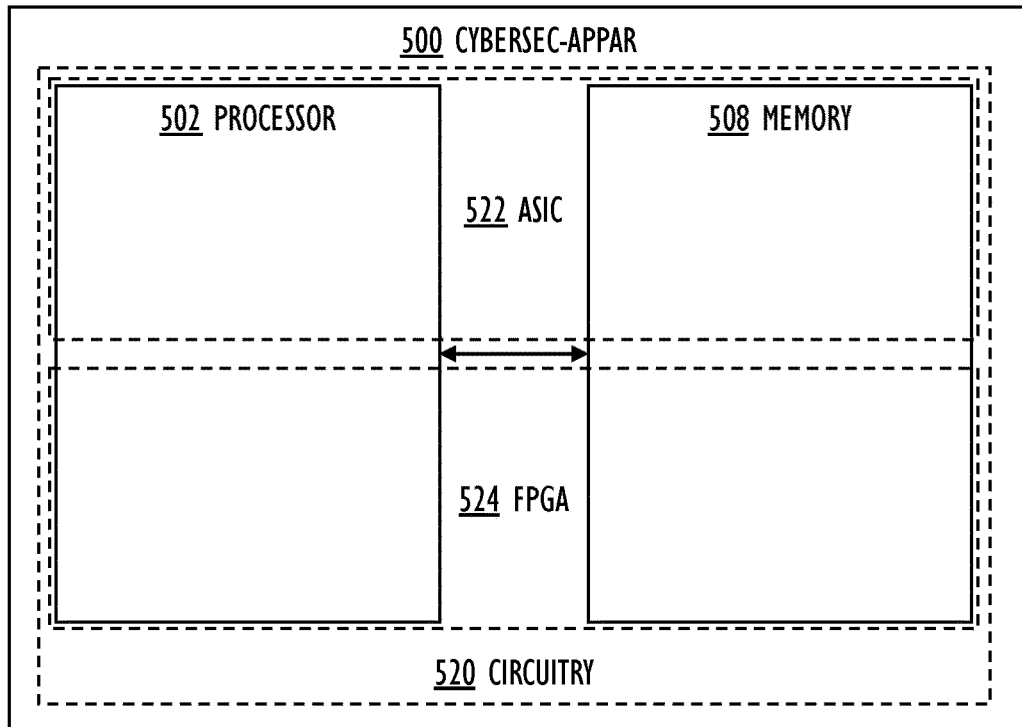

FIG. 5A and FIG. 5B illustrate examples of a cybersecurity apparatus 500 performing the operations of FIG. 1A, FIG. 1B, and FIG. 1C.

The method described with reference to FIG. 1A, FIG. 1B, and FIG. 1C may be implemented by the apparatus 500. The apparatus 500 may execute the operations defined in the method. The apparatus 500 may implement an algorithm, which includes at least the operations of the method, but may optionally include other operations related to the cybersecurity in general.

The apparatus 500 comprises one or more memories 508, and one or more processors 502 coupled to the one or more memories 508 configured to execute the operations described in FIG. 1A, FIG. 1B, and FIG. 1C.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Go, Java, Python, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 500 (the computer program 510 may first be loaded into the one or more microprocessors 504 as the instructions 506 and then executed by one or more microprocessors 504), causes the apparatus 500 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 500. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 500, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figure 6:
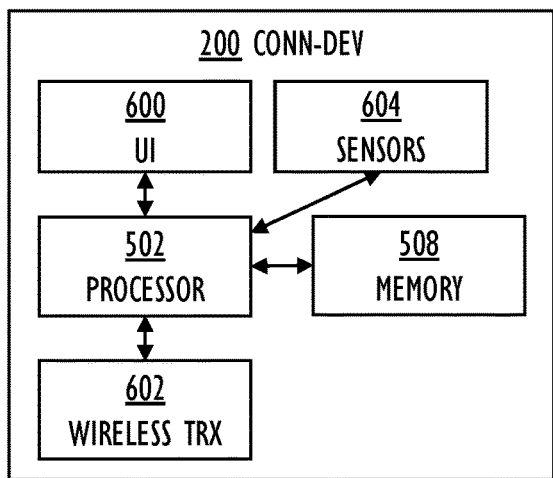
FIG. 6 is a block diagram illustrating an example of a connected device.

FIG. 6 illustrates an example of a connected device 200. As shown in FIG. 6, the connected device 200 comprises the one or more memories 508, and the one or more processors 502 coupled to the one or more memories 508 configured to implement functionality of the connected device, and possibly to carry out a part of the method/algorithm. In addition, the connected device 200 comprises a user interface 600 (such as a touch screen, or one or more LEDs), and one or more wireless transceivers (such as a WLAN transceiver, a cellular radio network transceiver, and a short-range radio transceiver) 602, and also one or more sensors 604. As shown in FIG. 2 and FIG. 4, the connected device 200, 200A, 200B, may be running a cybersecurity application 250, 250A, 250B.

Figure 7:
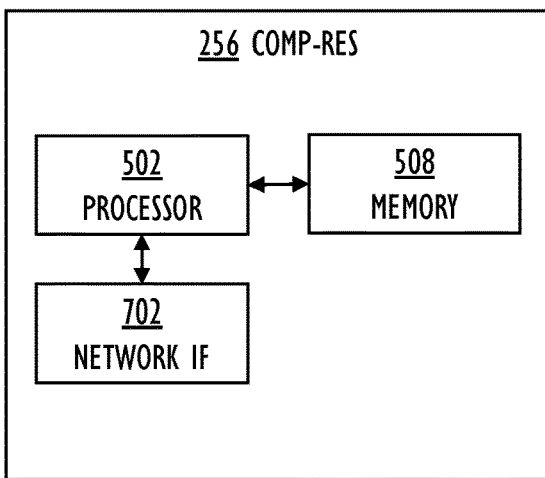
FIG. 7 is a block diagram illustrating an example of a computing resource.

FIG. 7 illustrates an example of the computing resource 256 such as a server apparatus. The server apparatus 256 may be a networked computer server, which interoperates with the connected device 200A, 200B and/or with the CPE 230 according to a client-server architecture, a cloud computing architecture, a peer-to-peer system, or another applicable distributed computing architecture. As shown in FIG. 7, the server apparatus 256 comprises the one or more memories 508, and the one or more processors 502 coupled to the one or more memories 508 configured to carry out a part of the method/algorithm. In addition, the server apparatus 256 comprises a network interface (such as an Ethernet network interface card) 702 configured to couple the server apparatus 256 to the Internet 410. As shown in FIG. 4, the computing resource 256 may be running a cybersecurity application 254, such as a cybersecurity server application 254.

Figure 8A:
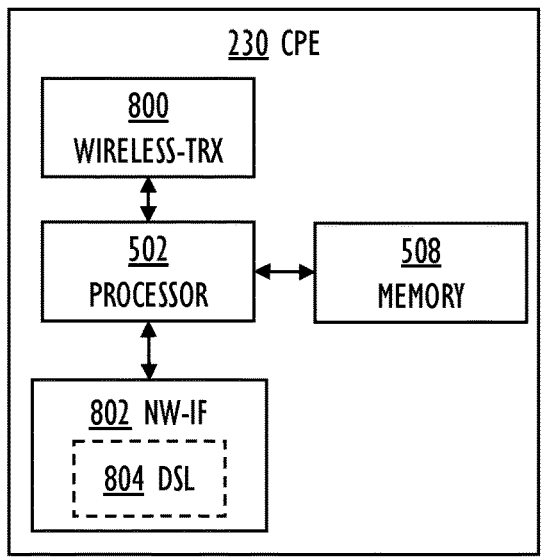
FIG. 8A and FIG. 8B are block diagrams illustrating examples of a customer-premises equipment.
Figure 8B:
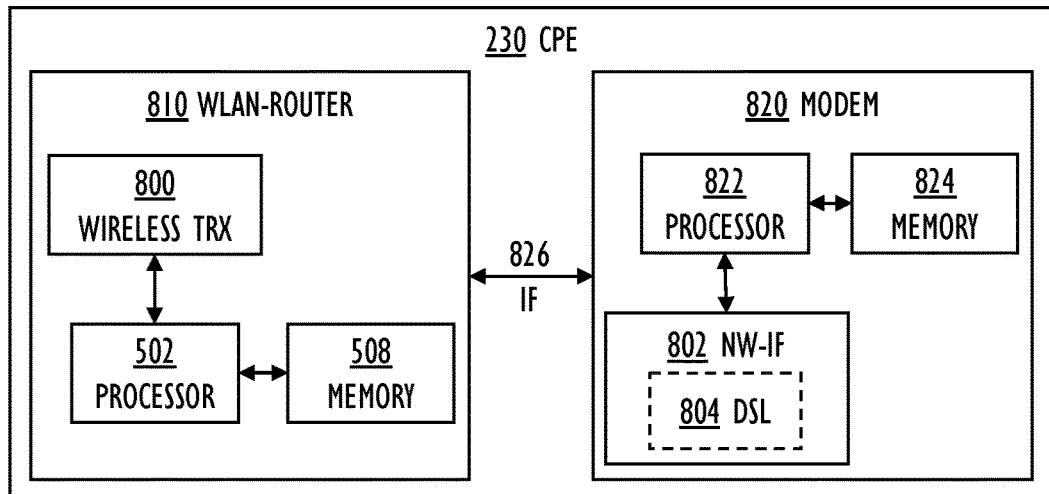

FIG. 8A and FIG. 8B illustrate examples of the CPE 230.

In FIG. 8A, the CPE 230 is an integrated apparatus comprising the one or more memories 508, and the one or more processors 502 coupled to the one or more memories 508 configured to carry out a part of the method/algorithm or the complete method/algorithm. Additionally, the CPE 230 comprises a wireless radio transceiver 800 configured to create the WLAN 402 for enabling access by the connected device 200A. The CPE 230 also comprises a network interface 802 to act as a modem configured to connect to the telecommunication circuit of the carrier at the demarcation point. The network interface 802 may operate as a DSL (Digital Subscriber Line) modem 804 using different variants such as VDSL (Very high bitrate DSL), SDSL (Symmetric DSL), or ADSL (Asymmetric DSL). As shown in FIG. 4, the CPE 230 may be running a cybersecurity application 252, such as a cybersecurity client application 252.

In FIG. 8B, the CPE 230 is a two-part apparatus. A WLAN router part 810 comprises the one or more memories 508, the one or more processors 502 coupled to the one or more memories 508 configured to carry out the method/algorithm, and the wireless transceiver 800 to create the WLAN 402 for enabling access by the connected device 200A. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user of the connected device 200A to gain access to the method/algorithm, whereas the modem part 820 may be provided by carrier providing the telecommunication circuit access. As shown in FIG. 8B, the WLAN router part 810 and the modem part 820 may be communicatively coupled by an interface 826 (such as a wired Ethernet interface).

As illustrated in FIG. 4, the functionality of the apparatus 500, including the capability to carry out the method/algorithm, may be implemented in a centralized fashion by a stand-alone single physical unit, or alternatively in a distributed fashion using more than one communicatively coupled physical units.

These physical units comprise one or more of the connected device 200, the connected device 200A at the home or office 400 running the cybersecurity application 250A with a home or office functionality, the connected device 200B on the move 420 running a cybersecurity application 250B with an on the move functionality, the CPE 230 running a cybersecurity client application 252, and the computing resource 256 running a cybersecurity server application 254. The method/algorithm operations may be implemented by one or more of these apparatuses 200A/200B/230/256 executing the cybersecurity applications 250A/250B/252/254.

As can be understood by the person skilled in the art, the method/algorithm operations may be distributed among the distributed software comprising the cybersecurity application 250A, 250B, the cybersecurity client application 252, and the cybersecurity server application 254 in numerous different configurations. In a first example, the cybersecurity application with the home functionality 250A communicates with the cybersecurity client application 252 and/or the cybersecurity server application 254 to implement the method/algorithm functionality. In a second example, the cybersecurity client application 252 communicates with the cybersecurity server application 254 to implement the method/algorithm functionality. In a third example, the cybersecurity application with the on the move functionality 250B communicates with the cybersecurity server application 254 to implement the method/algorithm functionality.

Thus, the cybersecurity application 250, 250A, 250B may comprise a stand-alone functionality to carry out the method/algorithm, or a part of the functionality, augmented by functionality of the cybersecurity client application 252 and/or by a functionality of the cybersecurity server application 254. Alternatively, the cybersecurity client application 252 may comprise a stand-alone fashion to carry out the method/algorithm, or a part of the functionality augmented by the functionality of the cybersecurity server application 254. As an additional alternative, the cybersecurity server application 254 may comprise a stand-alone fashion to carry out the method/algorithm. The cybersecurity application 250, 250A, 250B, and/or the cybersecurity client application 252 may operate as a frontend with a relatively limited resources as regards to the processor and memory, whereas the cybersecurity server application 254 may operate as a backend with a relatively unlimited resources as regards to the processor and memory, and the capability to serve a very large number of the connected devices 200A, 200B simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
obtaining information related to data communication between a plurality of connected devices, a subset of the plurality of connected devices forming a peer-to-peer (P2P) network;
based on the information, generating a directed graph comprising a plurality of nodes and a plurality of directed edges, each node of the plurality of nodes corresponding to a different connected device of the plurality of connected devices, and each directed edge of the plurality of directed edges extending between a pair of nodes of the plurality of nodes, each directed edge identifying a source node of the pair of nodes and a destination node of the pair of nodes, the source node corresponding to a source connected device of the plurality of connected devices that initiated a connection to a destination connected device of the plurality of connected devices and the destination node corresponding to the destination connected device, each node of the plurality of nodes comprising an internet protocol (IP) address of the connected device to which the node corresponds;

generating, based on directed edges of the directed graph, a plurality of source and destination pairs, wherein each source and destination pair contains a source IP address of a source connected device that corresponds to a source node of a pair of nodes identified by a directed edge, and a destination IP address of a destination connected device that corresponds to a destination node of the pair of nodes identified by the directed edge; and identifying the subset of the plurality of connected devices as P2P devices that form the P2P network based on the plurality of source and destination pairs.

2. The method of claim 1, wherein identifying the subset of the plurality of connected devices as the P2P devices that form the P2P network based on the plurality of source and destination pairs further comprises:

analyzing directed edges of each traversed node in the directed graph to determine an indegree of each traversed node, and an outdegree of each traversed node; and identifying a traversed node as a P2P device based on a ratio of the indegree of the traversed node to the outdegree of the traversed node.

3. The method of claim 2, wherein identifying the traversed node as the P2P device based on the ratio of the indegree of the traversed node to the outdegree of the traversed node further comprises:

identifying the traversed node as a P2P device in response to detecting that the ratio is one by a predetermined margin.

4. The method of claim 1, wherein generating the plurality of source and destination pairs further comprises:

selecting a start node in the directed graph; and determining a plurality of neighbor nodes for the start node, each neighbor node being connected to the start node by a directed edge, or being connected to the start node by a predetermined number of directed edges between the plurality of neighbor nodes; and wherein identifying the subset of the plurality of connected devices as P2P devices that form the P2P network based on the plurality of source and destination pairs further comprises:

determining a subset of the nodes as corresponding to connected devices that are P2P devices belonging to the P2P network based on the start node, the plurality of neighbor nodes, and the directed edges between the start node and the plurality of neighbor nodes.

5. The method of claim 4, wherein each respective node in the directed graph comprises one or more of a transmission control protocol (TCP) port number of the connected device to which the respective node corresponds and a user datagram protocol (UDP) port number of the connected device to which the respective node corresponds, and wherein determining the plurality of neighbor nodes for the start node further comprises one or more of the following:

choosing a neighbor node with a TCP port number being within a predetermined range of TCP port numbers; and choosing a neighbor node with a UDP port number being within a predetermined range of UDP port numbers.

6. The method of claim 4, wherein each respective node in the directed graph comprises one or more of a type of the connected device to which the respective node corresponds and a model of the connected device to which the respective node corresponds, and wherein determining the plurality of neighbor nodes for the start node further comprises one or more of the following:

choosing a neighbor node with a type of the connected device being within a predetermined set of connected device types; and choosing a neighbor node with a model of the connected device being within a predetermined set of connected device models.

7. The method of claim 4, wherein each node in the directed graph comprises one or more of a geographical location of the connected device to which the respective node corresponds and a network latency of the connected device to which the respective node corresponds, and wherein determining the plurality of neighbor nodes for the start node further comprises one or more of the following:

choosing a neighbor node with a geographical location within a predetermined geographical area; and choosing a neighbor node with a network latency within a maximum network latency from the start node.

8. The method of claim 1, further comprising:

prior to obtaining the information related to the data communication between the plurality of connected devices, intercepting, by a plurality of customer-premises equipment implementing local networks, the data communication between the plurality of connected devices.

9. The method of claim 1, further comprising:

prior to generating the plurality of source and destination pairs, pruning the directed graph to remove nodes with an IP address not being under a cybersecurity protection provided by an operator.

10. The method of claim 1, further comprising:

prior to generating the plurality of source and destination pairs, pruning the directed graph to remove nodes with an IP address belonging to a set of known servers.

11. The method of claim 1, further comprising:

prior to generating the plurality of source and destination pairs, pruning the directed graph to remove nodes having fewer directed edges than a predetermined threshold number.

12. The method of claim 1, wherein each directed edge in the directed graph comprises a timestamp of the data communication, and the method further comprises:

prior to generating the plurality of source and destination pairs, pruning the directed graph to remove directed edges that are older than allowed by a predetermined validity condition.

13. The method of claim 1, further comprising:

subsequent to identifying the subset of the plurality of connected devices as P2P devices that form the P2P network based on the plurality of source and destination pairs, performing a device identification of a connected device based on the connected device being detected as a P2P device belonging to the P2P network.

14. The method of claim 1, further comprising:

subsequent to identifying the subset of the plurality of connected devices as P2P devices that form the P2P network based on the plurality of source and destination pairs, performing a platform identification of a connected device based on the connected device being detected as a P2P device belonging to the P2P network.

15. The method of claim 1, further comprising:
subsequent to identifying the subset of the plurality of connected devices as P2P devices that form the P2P network based on the plurality of source and destination pairs, performing a botnet blocking for a connected device based on the connected device being detected as a P2P device belonging to the P2P network.

16. The method of claim 1, wherein identifying the subset of the plurality of connected devices as P2P devices that form the P2P network based on the plurality of source and destination pairs further comprises identifying the subset of the plurality of connected devices as P2P devices that form the P2P network based on the plurality of source and destination pairs and based at least in part on a quantity of connections of at least one P2P device with another P2P device.

17. An apparatus comprising:
one or more memories; and
one or more processors coupled to the one or more memories configured to:
obtain information related to data communication between a plurality of connected devices, a subset of the plurality of connected devices forming a peer-to-peer (P2P) network;
based on the information, generate a directed graph comprising a plurality of nodes and a plurality of directed edges, each node of the plurality of nodes corresponding to a different connected device of the plurality of connected devices, and each directed edge of the plurality of directed edges extending between a pair of nodes of the plurality of nodes, each directed edge identifying a source node of the pair of nodes and a destination node of the pair of nodes, the source node corresponding to a source connected device of the plurality of connected devices that initiated a connection to a destination connected device of the plurality of connected devices and the destination node corresponding to the destination connected device, each node of the plurality of nodes comprising an internet protocol (IP) address of the connected device to which the node corresponds;
generate, based on directed edges of the directed graph, a plurality of source and destination pairs, wherein each source and destination pair contains a source IP address of a source connected device that corresponds to a source node of a pair of nodes identified by a directed edge, and a destination IP address of a destination connected device that corresponds to a destination node of the pair of nodes identified by the directed edge; and
identify the subset of the plurality of connected devices as P2P devices that form the P2P network based on the plurality of source and destination pairs.

18. The apparatus of claim 17, wherein, to identify the subset of the plurality of connected devices as P2P devices that form the P2P network based on the plurality of source and destination pairs, the one or more processors coupled to the one or more memories are further configured to:
analyze directed edges of each traversed node in the directed graph to determine an indegree of each traversed node, and an outdegree of each traversed node; and
identify a traversed node as a P2P device based on a ratio of the indegree of the traversed node to the outdegree of the traversed node.

19. The apparatus of claim 17, wherein, to generate the plurality of source and destination pairs, the one or more processors coupled to the one or more memories are further configured to:
select a start node in the directed graph; and
determine a plurality of neighbor nodes for the start node, each neighbor node being connected to the start node by a directed edge, or being connected to the start node by a predetermined number of directed edges between the plurality of neighbor nodes, and
wherein, to identify the subset of the plurality of connected devices as P2P devices that form the P2P network based on the plurality of source and destination pairs, the one or more processors coupled to the one or more memories are further configured to:
determine a subset of the nodes as corresponding to connected devices that are P2P devices belonging to the P2P network based on the start node, the plurality of neighbor nodes, and the directed edges between the start node and the plurality of neighbor nodes.

20. A non-transitory computer-readable medium comprising a computer program with instructions which, when executed by an apparatus, cause the apparatus to:
obtain information related to data communication between a plurality of connected devices, a subset of the plurality of connected devices forming a peer-to-peer (P2P) network;
based on the information, generate a directed graph comprising a plurality of nodes and a plurality of directed edges, each node of the plurality of nodes corresponding to a different connected device of the plurality of connected devices, and each directed edge of the plurality of directed edges extending between a pair of nodes of the plurality of nodes, each directed edge identifying a source node of the pair of nodes and a destination node of the pair of nodes, the source node corresponding to a source connected device of the plurality of connected devices that initiated a connection to a destination connected device of the plurality of connected devices and the destination node corresponding to the destination connected device, each node of the plurality of nodes comprising an internet protocol (IP) address of the connected device to which the node corresponds;
generate, based on directed edges of the directed graph, a plurality of source and destination pairs, wherein each source and destination pair contains a source IP address of a source connected device that corresponds to a source node of a pair of nodes identified by a directed edge, and a destination IP address of a destination connected device that corresponds to a destination node of the pair of nodes identified by the directed edge; and
identify the subset of the plurality of connected devices as P2P devices that form the P2P network based on the plurality of source and destination pairs.

* * * * *